United States Patent
Meth et al.

(10) Patent No.: US 6,282,703 B1
(45) Date of Patent: Aug. 28, 2001

(54) STATICALLY LINKING AN APPLICATION PROCESS WITH A WRAPPER LIBRARY

(75) Inventors: Kalman Z. Meth, Netanya (IL); Jan Civlin, Sunnyvale, CA (US); Itai Nahshon, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,364

(22) Filed: Oct. 29, 1998

(51) Int. Cl.$^7$ .................................................. G06F 9/445
(52) U.S. Cl. ................................................................ 717/6
(58) Field of Search ............................................ 717/1–11

(56) References Cited

U.S. PATENT DOCUMENTS

| | | | | |
|---|---|---|---|---|
| 5,210,874 | | 5/1993 | Karger ................................. | 395/650 |
| 5,339,438 | * | 8/1994 | Conner et al. ........................ | 375/700 |
| 5,421,016 | * | 5/1995 | Conner et al. ........................ | 395/700 |
| 5,428,782 | | 6/1995 | White .................................... | 395/650 |

(List continued on next page.)

OTHER PUBLICATIONS

Bridging traditional and object technologies: Creating transitional applications; Lindsey, A H; IBM Systems Journal, Armonk; 1997; vol. 36, Iss. 1; p. 32, 17 pgs.*

Silva, Luis M. and Joao Gabriel Silva, Checkpointing Distributed Shared Memory, Journal of Supercomputing, 11:137–158 (1997).

Naik, Vijay K., Samuel P. Midkiff, Jose E. Moreira, A Checkpointing Strategy for Scalable Recovery on Distributed Parallel Systems, IBM Research Report, RC 20964 (92576) Jun. 23, 1997.

Plank, James S., Efficient Checkpointing on MIMD Architectures, Ph.D. Dissertation, Princeton University (Jun. 1993).

Litzkow, Micahel and Marvin Solomon, Supporting Checkpointing and Process Migration Outside the UNIX Kernel, Usenix Winter Conference (Jan. 1992).

Plank, James S., Micah Beck and Gerry Kingsley, LIB-CKPT: Transparent Checkpointing Under UNIX, Usenix Winter 1995 Techincal Conference (Jan. 1995).

Tannenbaum, Todd and Michael Litzkow, The Condor Distributed Processing Sytem,Dr. Dobb's Journal, pp 40–48 (Feb. 1995).

Plank, James S., An Overview of Checkpointing in Uniprocessor and Distributed Systems, Focusing on Implementation and Performance, Technical Report UT–CS–97–372, Department of Computer Sciences, University of Tennessee (Jul. 1997).

*Primary Examiner*—Mark Powell
*Assistant Examiner*—Michael B. Holmes
(74) *Attorney, Agent, or Firm*—Floyd A. Gonzalez, Esq.; Kevin P. Radigan, Esq.; Heslin & Rothenberg, P.C.

(57) ABSTRACT

A technique for statically linking an application process to a wrapper library employed in intercepting one or more calls invoked by the application process. The intercepted calls may comprise system calls or library calls. In a first link step, the application process is statically linked with at least the intercept library, and in one embodiment, all libraries associated with the application process except for the wrapper library. This first statically linking step creates a first module. Thereafter, at least one call invoked by the application process, and to be intercepted by the intercept library, is renamed. The renaming of the intercepted call is from its original name to a temporary name in the standard program library, the intercept library and the application program. This renaming step creates a second module that no longer contains the original name of the at least one intercepted call. The second linking step is to statically link the second module with the wrapper library, thereby creating an executable module wherein the application process is statically linked to all libraries while still providing for interception of the at least one system or library call within the executable.

24 Claims, 10 Drawing Sheets

U.S. PATENT DOCUMENTS

| | | | |
|---|---|---|---|
| 5,428,792 | * | 6/1995 | Conner et al. .......................... 395/700 |
| 5,493,680 | * | 2/1996 | Danforth ................................ 395/700 |
| 5,584,023 | | 12/1996 | Hsu ........................................ 395/620 |
| 5,590,329 | * | 12/1996 | Goodnow, II et al. .............. 395/708 |
| 5,590,331 | * | 12/1996 | Lewis et al. .......................... 395/708 |
| 5,694,601 | | 12/1997 | White .................................... 395/671 |
| 5,724,556 | | 3/1998 | Souder et al. ........................ 395/500 |
| 5,794,018 | * | 8/1998 | Vrvilo et al. .......................... 395/551 |
| 5,889,992 | * | 3/1999 | Koerber ................................ 395/702 |
| 6,154,878 | * | 11/2000 | Saboff ..................................... 717/11 |
| 6,199,203 | * | 3/2001 | Saboff ..................................... 717/11 |
| 6,202,205 | * | 3/2001 | Saboff et al. ............................ 717/9 |

* cited by examiner

STATICALLY LINKING AN APPLICATION PROCESS WITH A WRAPPER LIBRARY

CROSS REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"A Method Of Performing Checkpoint/Restart Of A Parallel Program," by Meth et al., Ser. No. 09/181,985.

"Capturing And Identifying A Complete And Consistent Set Of Checkpoint Files," by Meth et al., Ser. No. 09/182, 175.

"Restoring Checkpoint Processes Including Adjusting Environment Variables Of The Processes," by Meth et al., Ser. No. 09/182,357; and "Restoring Checkpointed Processes Without Restoring Attributes Of External Data Referenced By The Processes," by Meth et al., Ser. No. 09/182,725.

TECHNICAL FIELD

This invention relates in general to statically bound application processes, and in particular, to a technique for intercepting calls between an application process and a program library in a statically linked environment.

BACKGROUND OF THE INVENTION

Intercepting system calls is sometimes needed in order to perform certain special processing in addition to normal system call processing. One such example is a user-level checkpoint/restart mechanism, in which it is necessary to keep track of files that are in use by a program. Checkpointing facilitates recovery of a process by recording intermediate states of the process at particular intervals. This enables the process to be restarted from the last checkpoint, rather than from the beginning of the process.

Most modern operating systems employ a "dynamic link library", which refers to the ability of a system to load the library used by a program while the program is being loaded or even running. One use of a dynamic link library is the ability to create and use shared object modules. Shared object modules enable the system to use the same object module (i.e., dynamic library) for all of the programs running on the system that use that shared object module. Since the dynamic library is loaded for the program at run time, the system need not load an additional copy of the library if the library is already loaded for another application program. Unfortunately, in many systems, it is not possible today to perform user-level checkpointing and restarting of a program that uses dynamically linked libraries.

Further, when implementing checkpoint/restart from user space, it is necessary to track files that are used by the program. This is typically done by intercepting the basic system calls that manipulate files, such as open( ), close( ), dup( ), etc. There will thus, for example, be an open( ) function call in the checkpoint library that gets called whenever the program calls open( ), either directly or indirectly, such as from inside an fopen( ) call. This function must in turn call the actual open( ) system call. However, one cannot simply call open( ) since that will in turn result in calling the intercepting open( ) library function rather than the system call. This is because the general rule employed by a linker is that if there is a locally defined function, that function takes precedence over a system call function where the functions have the same name. Thus, one problem to be addressed is how to call the actual system call after the intercepting has occurred.

The Condor Distributed Processing System describes one embodiment for checkpoint and migration of UNIX and AIX processes. This system is described in various publications, including for example, Tannenbaum et al. entitled "The Condor Distributed Processing System", Dr. Dobb's Journal, February 1995; and Litzkow et al. entitled "Checkpoint and Migration of UNIX Processes in the Condor Distributed Processing System", University of Wisconsin— Madison Computer Science Technical Report #1346, April 1997, available at http://www.cs.wisc.edu/condor/doc/ckpt97.ps. A similar mechanism is employed in International Business Machines Corporation's "LoadLeveler" product, which is described in IBM's manual entitled "LoadLeveler: Using and Administering", Version 1.3, Publication No. SC23-3989, August, 1996.

The Condor system for UNIX recommends using a syscall( ) mechanism available on certain UNIX systems to call a system call without using the actual name of the system call. However, in AIX implementations, there is no such syscall( ) mechanism. One way around this is to employ system call wrappers (to the system kernel) in a separate library from the rest of the intercept library. The system call wrapper library is then dynamically linked separately, and has (for example) its open( ) call bound with the real open( ) system call. By way of example, the library may be dynamically linked with a checkpointable program. All the other libraries are statically linked with the program, and hence all other open( ) calls are bound with the checkpoint open( ) wrapper. Since the wrapper library is dynamically linked with the program, the wrapper library must be present in the proper library location on each machine when the checkpointable program is run. If the dynamic system call wrapper library were not present, the loader would be unable to load and execute the program.

In view of the above, it would be desirable to statically link the entire program, thus avoiding the necessity of ensuring that the dynamic library is in place on the machine on which the program is run (or restored/migrated). The present invention is directed to meeting this need by statically linking an application process with a wrapper library while still allowing the desired intercept function.

DISCLOUSURE OF THE INVENTION

Briefly summarized, the invention comprises in one aspect a method to statically link an application process with a wrapper library and associated system kernel. The method includes: statically linking the application process with a intercept library to create a first module; subsequent thereto, renaming at least one intercepted call invoked by the application process, the renaming of the at least one intercepted call being from its original name to a temporary name thereby creating a second module that no longer contains the original name of the at least one intercepted call; and statically linking the second module with the wrapper library to create an executable module.

In another aspect, a system is provided for statically linking an application process with a wrapper library and associated system kernel. The system includes means for statically linking the application process with an intercept library to create a first module, and means for renaming at least one intercepted call invoked by the application process.

The renaming of the at least one intercepted call is from the call's original name to a temporary name, thereby creating a second module that no longer contains the original name of the at least one intercepted call. The system further includes means for statically linking the second module with the wrapper library to create an executable module.

In a further aspect, an article of manufacture is provided which includes at least one computer usable medium having computer readable program code means embodied therein for statically linking an application process with a wrapper library and associated system kernel. The computer readable program code means in the article of manufacture includes: computer readable program code means for causing a computer to effect statically linking the application process with an intercept library to create a first module; computer readable program code means for causing a computer to effect renaming at least one intercepted call invoked by the application process, the renaming of the at least one intercepted call being from its original name to a temporary name thereby creating a second module that no longer contains the original name of the at least one intercepted call; and computer readable program code means for causing a computer to effect statically linking the second module with the wrapper library to create an executable module.

To restate, a statically linking technique is provided herein for producing an executable module that intercepts system calls or library calls. By statically linking the entire program, the prior need to ensure that a dynamic library is in place on the machine on which a program is run, restored or migrated, is avoided. In the present solution, since the program is completely statically linked and self-contained, there is no need to have the system call wrapper library or library call wrapper library present on the machine on which the program is eventually run. Further, the technique is generally applicable to all types of programs, whether parallel or serial (uniprocessor).

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, this invention relates to a method for statically linking an application process with a wrapper library used during intercepting of system calls or library calls. The statically linking is a multi-step link process with a renaming step interposed between the linking steps. This linking approach is implemented with a linker such as the "ld" command described in an International Business Machines publication entitled "AIX Version 4.3 Commands Reference", Volumes 1–6, Publication No. SBOF-1877, October, 1997, the entirety of which is hereby incorporated herein by reference. Note that although described herein with reference to the AIX environment, and the checkpointing function in particular, the invention is applicable to other UNIX implementations or intercept functions. Thus, the claims appended hereto are not intended to be limited by the specific examples provided herein.

Figure 1A:
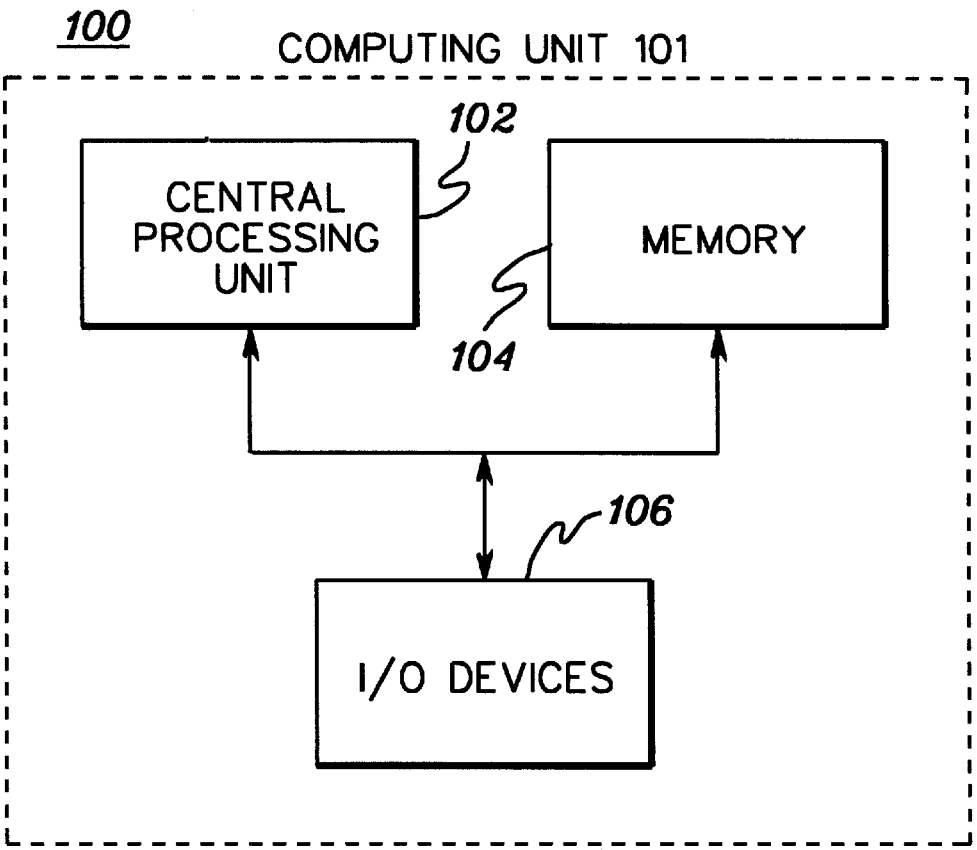
FIGS. 1a & 1b depict examples of computing environments incorporating and using the statically linking for call intercept concepts of the present invention.

One example of a computing environment incorporating and using the intercept/linking concepts of the present invention is depicted in FIG. 1a. Computing environment 100 includes, for instance, a computing unit 101 having at least one central processing unit 102, a main memory 104 and one or more input/output devices 106, each of which is described below.

As is known, central processing unit 102 is the controlling center of computing unit 101 and provides the sequencing and processing facilities for instruction execution, interruption action, timing functions, initial program loading and other machine related functions.

The central processing unit executes at least one operating system, which as known, is used to control the operation of the computing unit by controlling the execution of other programs, controlling communication with peripheral devices and controlling use of the computer resources.

Central processing unit 102 is coupled to main memory 104, which is directly addressable and provides for high speed processing of data by the central processing unit. Main memory 104 may be either physically integrated with the CPU or constructed in standalone units.

Main memory 104 and central processing unit 102 are also coupled to one or more input/output devices 106. These devices include, for instance, keyboards, communications controllers, teleprocessing devices, printers, magnetic storage media (e.g., tape disks), direct access storage devices, sensor-based equipment, and other storage media. Data is transferred from main memory 104 to input/output devices 106, and from the input/output devices back to main memory.

In one example, computing environment 100 is a single system environment, which includes an RS/6000 computer system running an AIX operating system. (RS/6000 and AIX are offered by International Business Machines Corporation.) In another example, computing environment 100 includes a UNIX workstation running a UNIX-based operating system. Other variations are also possible and are considered a part of the claimed invention.

Figure 1B:
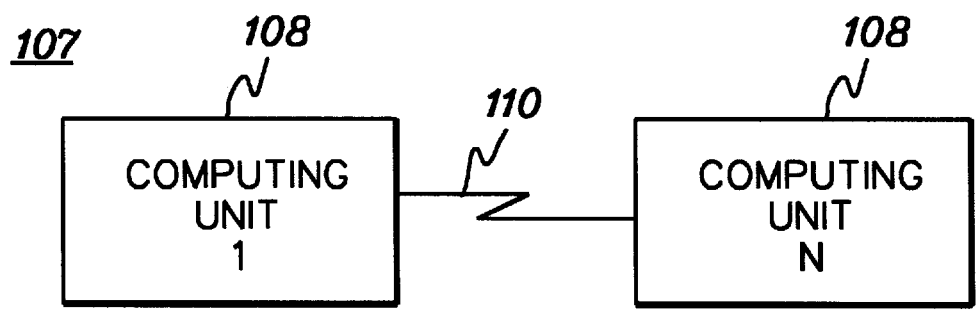

Another embodiment of a computing environment incorporating and using the intercept/linking capabilities of the present invention is depicted in FIG. 1b. In one example, a computing environment 107 includes a plurality of computing devices 108 coupled to one another via a connection 110. By way of example, each unit is an RS/6000 computing node running AIX, and the units are coupled together via a token ring or a local area network (LAN). Each unit includes, for instance, a central processing unit, memory and one or more input/output devices. In another embodiment, each unit is a UNIX workstation running a UNIX-based operating system, and the units are coupled to one another via a TCP/IP connection.

In yet a further embodiment, the environment includes a large parallel system with a plurality of units (e.g., 512 nodes) coupled to one another via a network connection, such as a switch. The invention is not limited to a particular number of units coupled together nor the type of units that are coupled.

The above embodiments are presented by way of examples only. The capabilities of the present invention can be incorporated and used with any type of computing environment or computing unit (e.g., nodes, computers, processors, systems, machines, and/or workstations), without departing from the spirit of the present invention.

A computing unit of the present invention is capable of executing both serial processes and parallel programs. A parallel program includes one or more processes (or tasks) that are executed independently.

Figure 2:
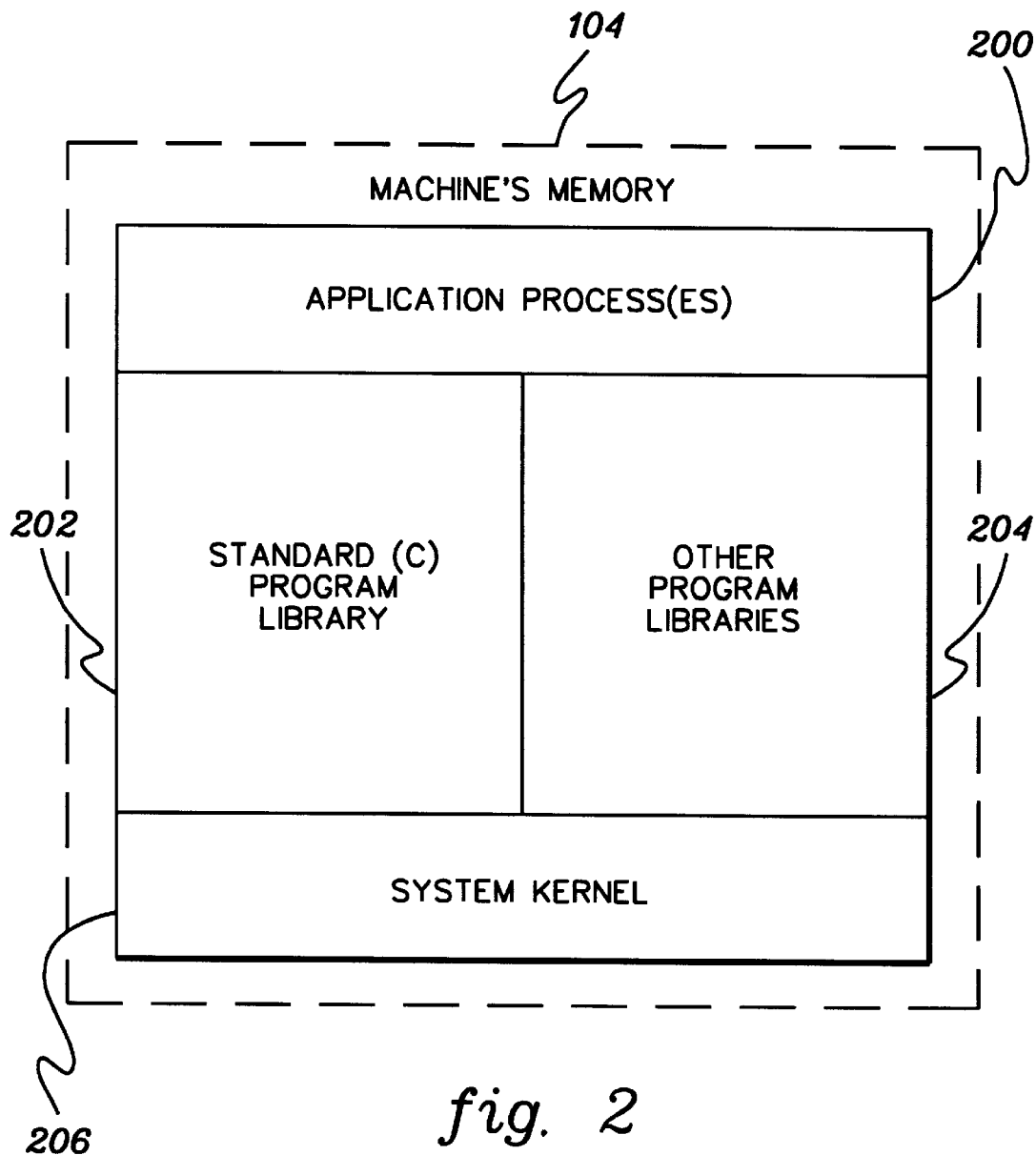
FIG. 2 depicts one example of the various components of the machine memory depicted in FIG. 1a, in accordance with the principles of the present invention.

Each process (e.g., a serial process, a process of a parallel program, or any other type of process) is loaded in the memory of the computing unit that is to execute the process. One embodiment of machine memory 104 is depicted in FIG. 2. As shown, memory 104 includes an application process 200. Each process makes library calls to various program libraries 202 and 204, also loaded within the memory. One program library that may be called is a checkpoint/restart library, which may comprise a portion of other program libraries 204. A checkpoint/restart library is called by each process that wishes to use the checkpoint/restart function described, for instance, in the above-incorporated co-filed patent applications. In addition to the above, memory 104 includes a system kernel 206, which provides various system services to the application processes and the libraries. FIG. 2 also shows that the one or more application processes run on top of the various program libraries, which in turn run on top of the system kernel.

Figure 3:
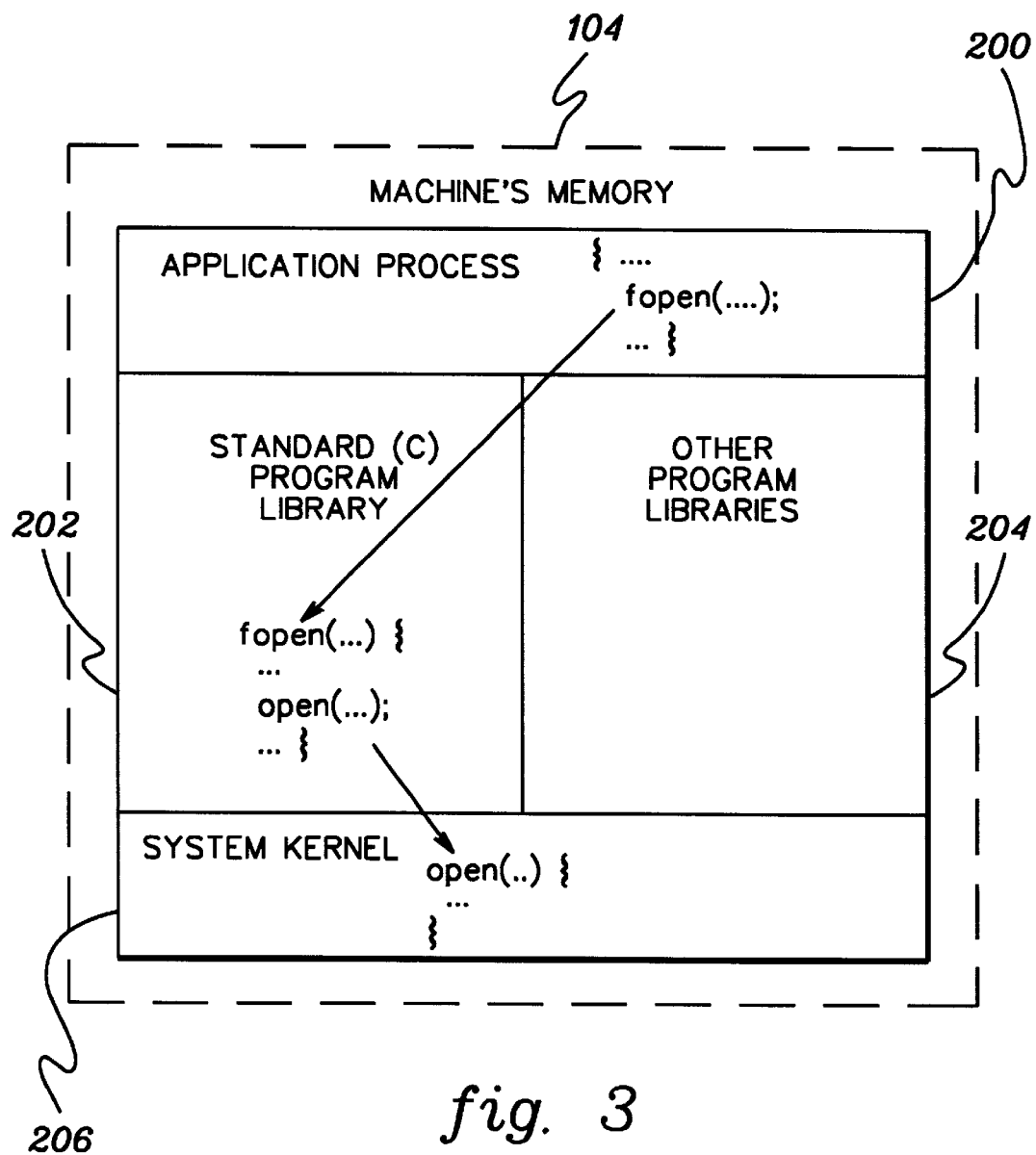
FIG. 3 depicts one example of a standard open( ) system call without intercept.

A typical call to a library function "fopen( )" is depicted in FIG. 3 from an application process 200. The "fopen( )" function resides in standard program library 202, and itself invokes a system call "open( )" (i.e., a function provided by system kernel 206). Those skilled in the art will note that the system call employed in the examples discussed herein (i.e., "open( )") is provided by way of example only and that the concepts presented can be applied to other system calls or library calls as well, such as an openx( ), close( ), creat( ), kfcntl( ) or dup( ) call.

Figure 4:
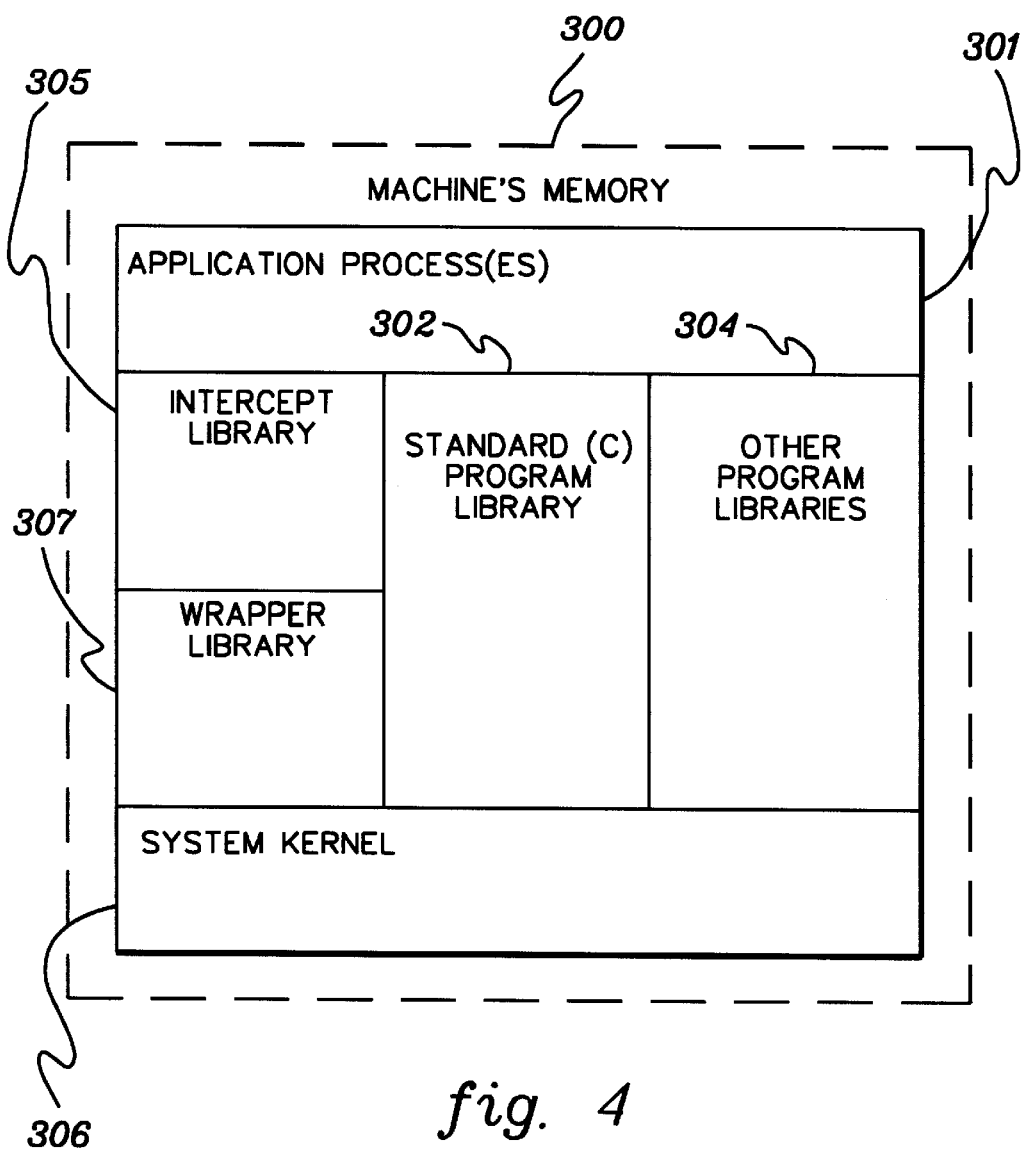
FIG. 4 depicts an example of machine memory employing a system call intercept library and system call wrapper library for intercepting system calls from an application process in accordance with the principles of the present invention.

FIG. 4 depicts one organizational embodiment of a machine memory 300 employing a system call intercept capability such as presented in the present invention. Memory 300 again includes application processes 301 which run on top of various program libraries, including standard (C) program library 302, other program libraries 304, intercept library 305 and wrapper library 307. In one embodiment, the intercept library contains function names that are identical to system call names to be intercepted. Functions whose names match names of both system calls and library provided functions are generally resolved by the linker to the library functions over the system calls. This serves the purpose of intercepting the system calls. Intercept library 305 makes use of functions in wrapper library 307 to eventually call the actual system call located in system kernel 306.

Figure 5:
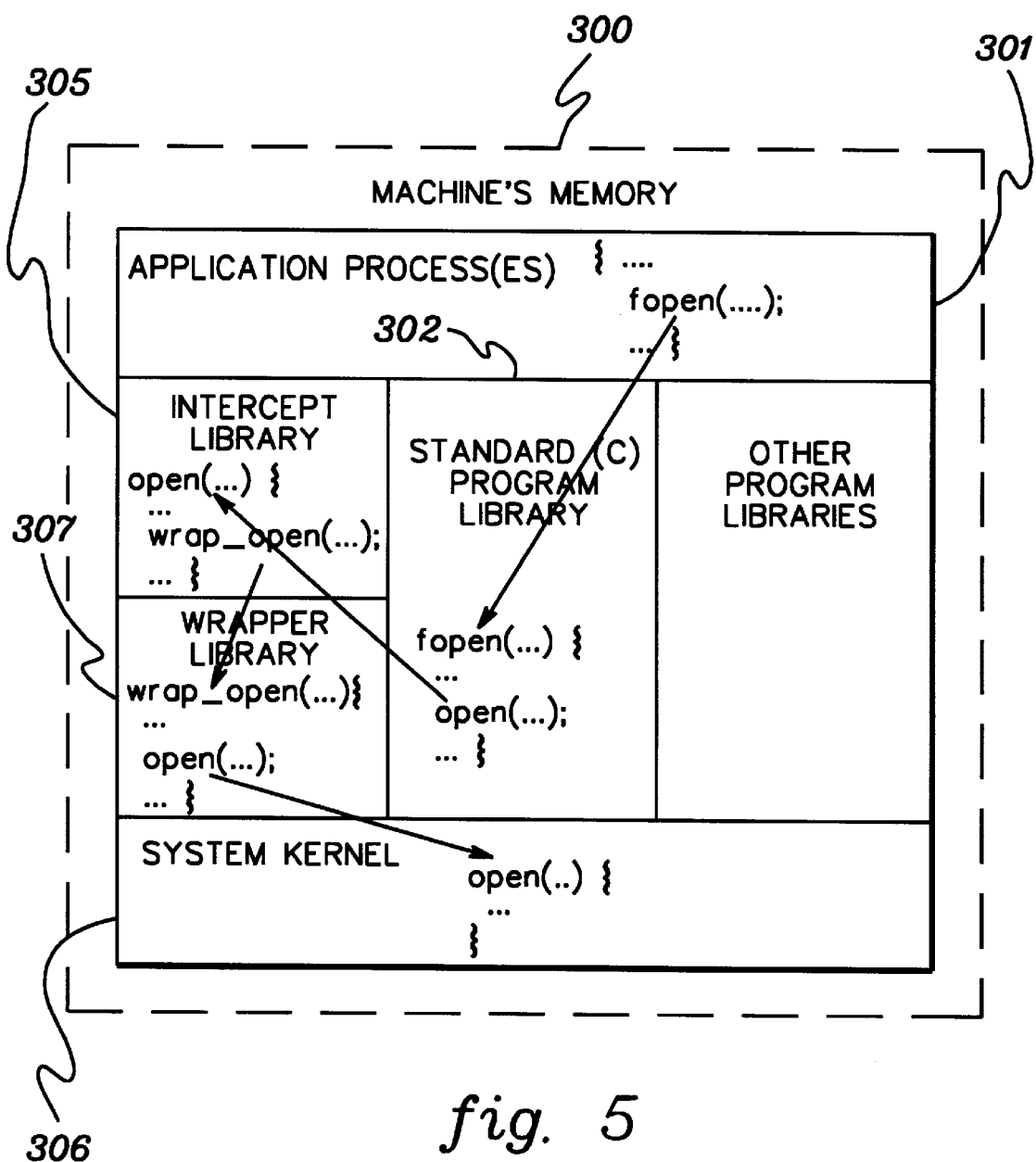
FIG. 5 depicts an example of machine memory showing the desired goal of intercepting a system call, i.e., open( ) system call, using the intercept library and wrapper library of FIG. 4.

FIG. 5 depicts the desired sequence of operations when performing system call interception employing the machine memory configuration of FIG. 4. An application process, in one example, calls "fopen( )" in the standard (C) program library, which itself calls "open( )". The open( ) call is resolved to the open( ) function in intercept library 305 instead of the actual open( ) system call in system kernel 306. After the open( ) system call is intercepted, the intercepting function performs certain processing, and eventually wants to call the actual open( ) system call in system kernel 306. This is accomplished by going through the wrapper function wrap_open( ), which calls the actual open( ) system call. This is an example of processing in the Condor environment under AIX, where the wrapper library is dynamically linked with the program, while the remainder of the application and the other libraries are statically linked. The wrapper library is linked separately from the remainder of the program so that its reference to open( ) is not resolved to the open( ) in the intercept library 305. Instead, the open( ) in the wrapper library 307 is resolved to the open( ) system call in the system kernel as shown.

Figure 6:
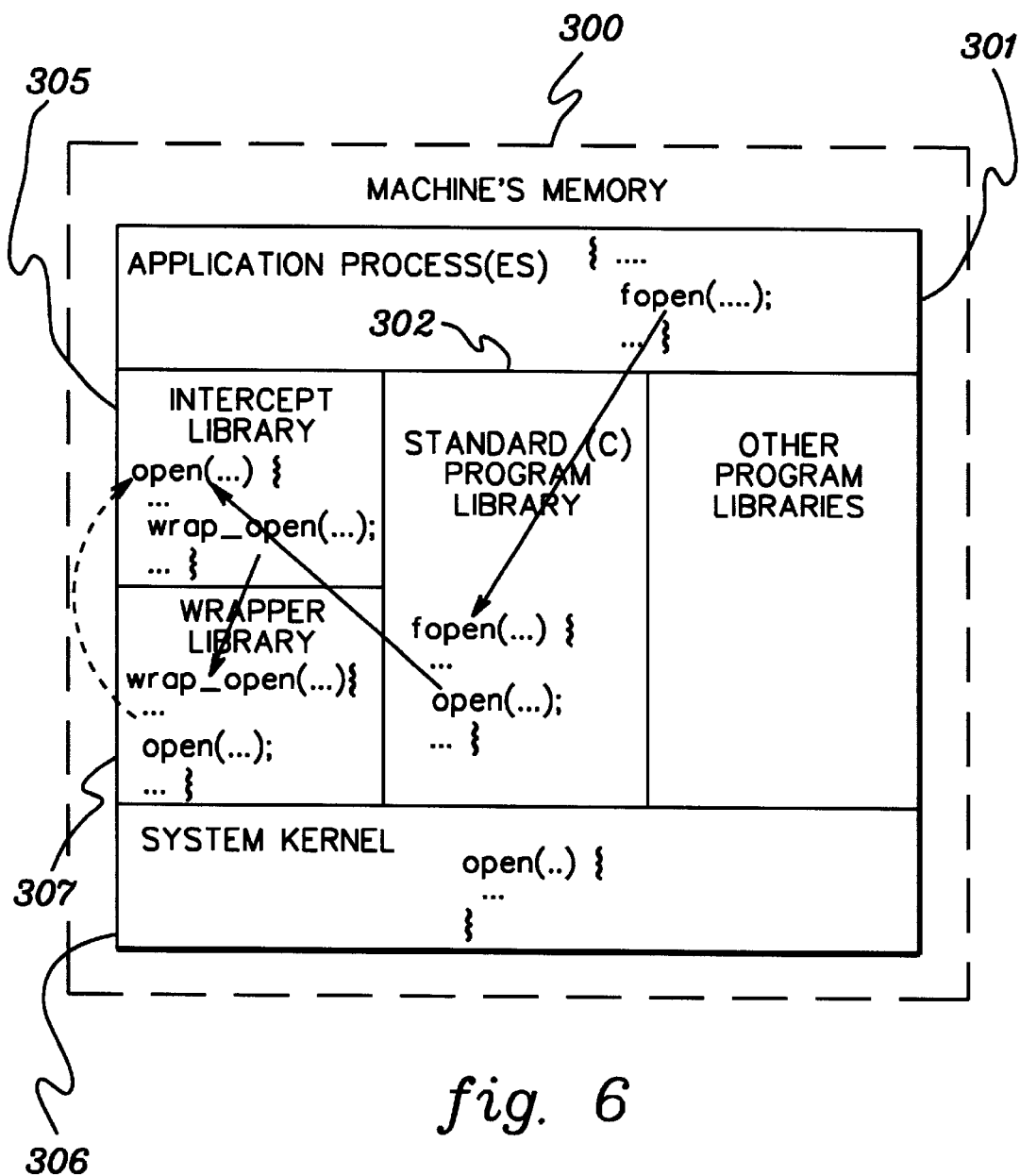
FIG. 6 depicts an example of an actual call sequence in certain UNIX and AIX systems when an intercept library and wrapper library are employed in a fully statically linked environment without the present invention.

If all the libraries shown in FIG. 5 are statically linked, then what would conventionally happen is depicted in FIG. 6. Since the wrapper library 307 is statically linked in the same module as the intercept library, the open( ) call from wrapper library 307 is resolved to the open( ) function defined in intercept library 305, which is obviously not desired. The present invention is presented as a technique for addressing this problem.

Figure 7:
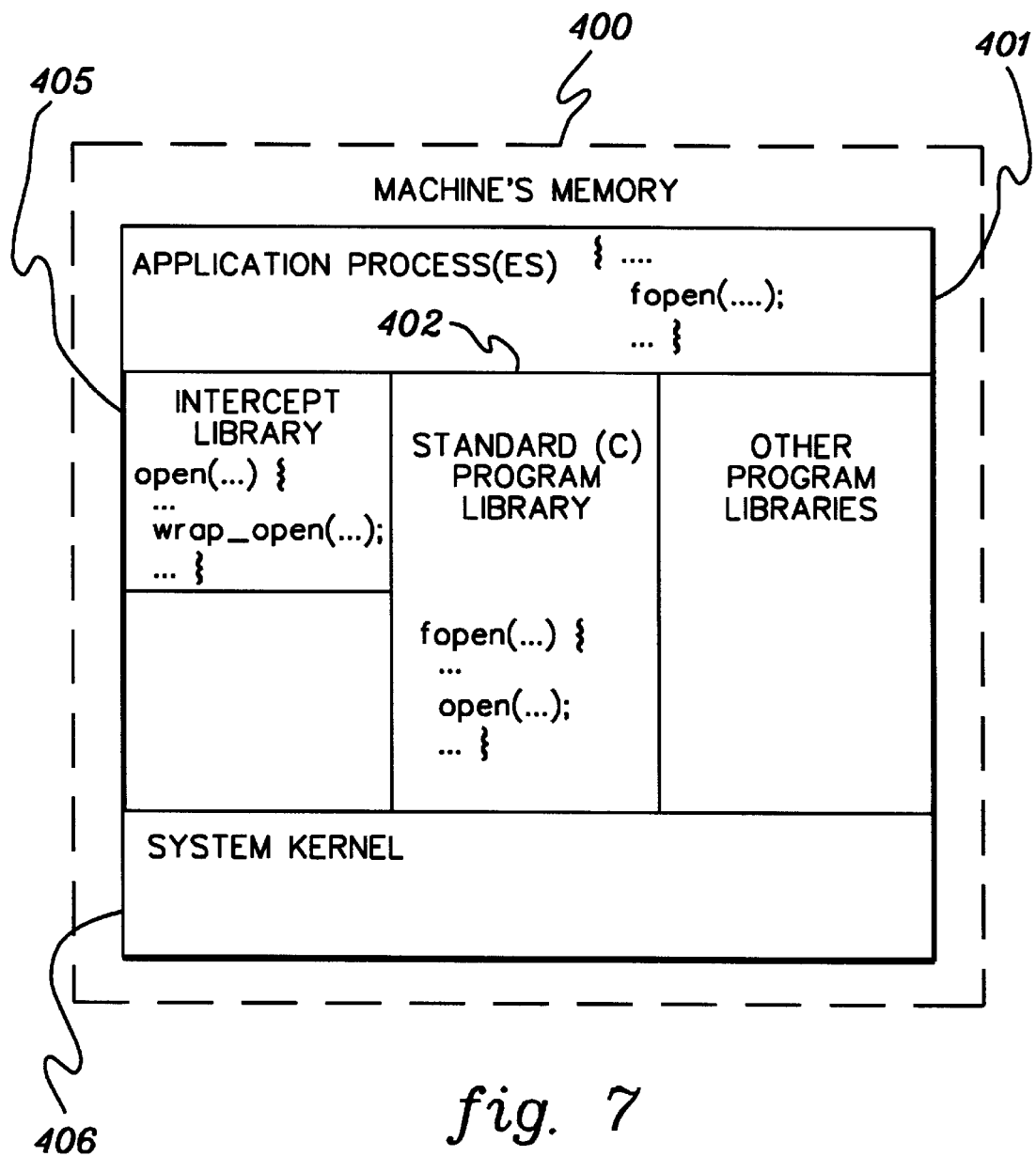
FIG. 7 depicts an example of a first link step in accordance with the present invention wherein an application process is statically linked to the system call intercept library, and other libraries, to create a module.
Figure 8:
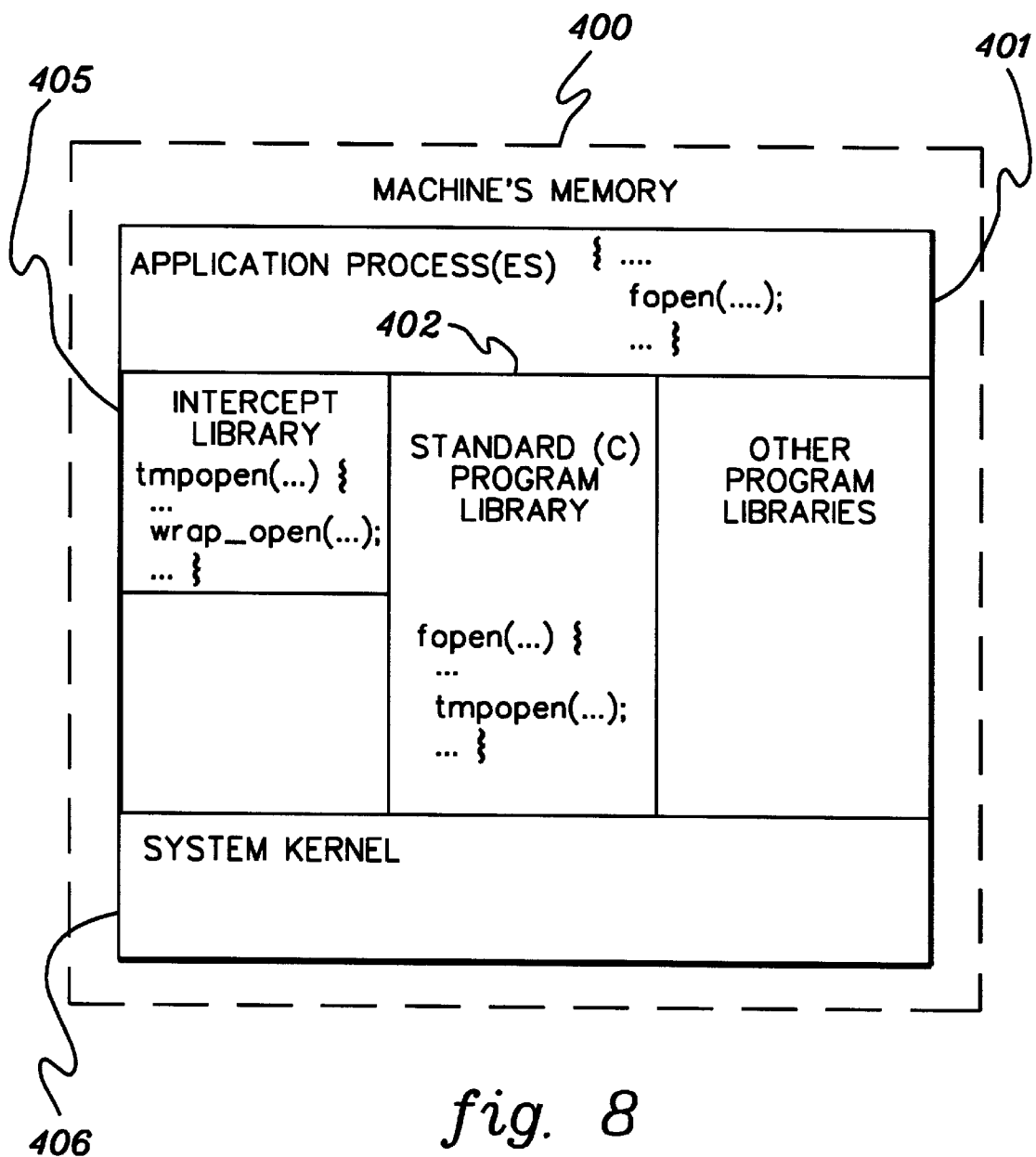
FIG. 8 depicts a next process step in accordance with the present invention wherein a system call (for example, open( )) of the statically linked application process is renamed to a temporary name (for example, tmpopen( )) thereby creating a second module.

A method is presented in accordance with this invention to statically link the wrapper library, which then allows the process to be run on any other AIX system, even if the wrapper library is not present on that system. The linking process is broken into several stages. First, the application process is statically linked with almost all libraries, including the library that intercepts the system calls, but excluding the wrapper library. This is depicted in FIG. 7. After statically linking the application process with the intercept library, the name of each system or library call to be intercepted is changed from its original name to a temporary name. This is depicted in FIG. 8, wherein the "open( )" function is shown renamed to "tmpopen( )" in both the standard (C) program library and the intercept library. As far as the linker is now concerned, there is no longer a function named "open( )" in the linked module employing these libraries.

Figure 9:
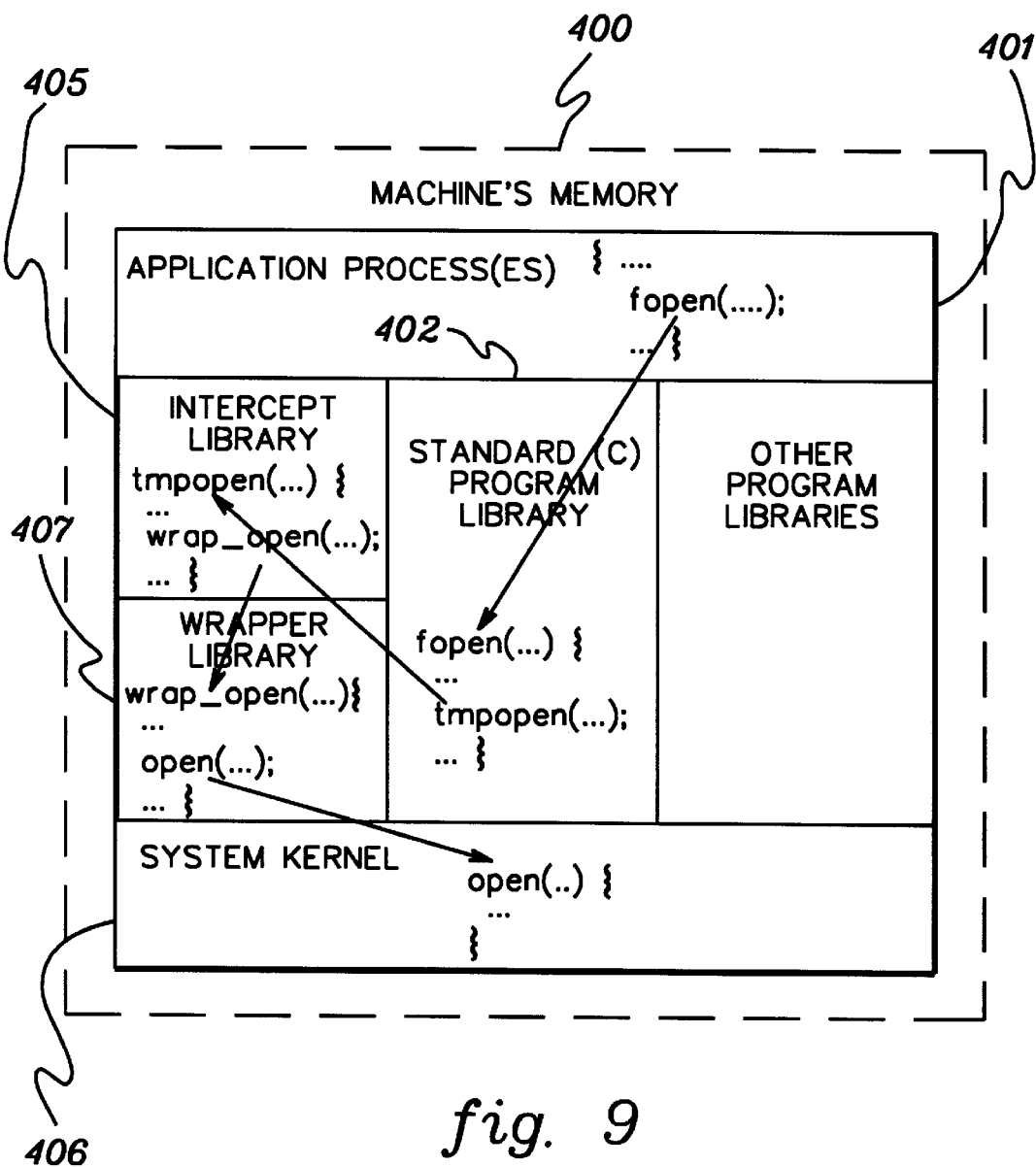
FIG. 9 depicts an example of a second link step in accordance with the present invention wherein the system call wrapper library is statically linked to the second module resulting from the renaming of the at least one intercepted system call, thereby producing an executable module.

After modifying the names of intercepted calls, a second link step is performed, as shown in FIG. 9, wherein the wrapper library 407 is statically linked with the remainder of the application process so that the function wrap_open( ) in intercept library 405 is resolved. The reference in the wrapper library 407 to open( ) is now no longer resolved to the open( ) function in the intercept library 405 since there is no longer an open( ) function in that library because the function was renamed to tmpopen( ). Thus, the reference to open( ) in the wrapper library 407 is resolved to the only other "open( )" that is known to the linker, which is the actual open( ) system call in the system kernel.

In AIX, the commands to accomplish this static linking and renaming would be, by way of example, as follows:

ld -bnso program.o libintercept.a -o program.tmp \
   /usr/lib/crt0.o \
   -brename:open,tmpopen \
   -brename:.open,.tmpopen \
   -brename:close,tmpclose \
   -brename:.close,.tmpclose \
   ........ \
   -r -lc ld -bnso program.tmp libwrap.a \
   -bI:/usr/lib/syscalls.exp -o program In this example, libintercept.a is the intercept library that contains the intercepting function calls for open( ), close( ), etc., and libwrap.a is the library that contains the system call wrapper functions, i.e., that call the actual system call. The first ld command resolves all of the open( ) system calls to the intercept library open( ) call, etc. It then changes the name of the open( ) call to tmpopen( ). When the second ld command is executed, there is no longer an open( ) call in the program. The open( ) call inside libwrap.a is therefore not resolved to the open( ) call in the intercept library. The only other open( ) that the loader can find is the open( ) system call in syscalls.exp. Thus, the wrapper function will be able to call the actual system call. The -bnso option causes the program to be statically linked. By way of example, the loader is discussed in an IBM publication entitled "AIX Version 4.0 Files Reference," publication number SC23-4168 (October, 1997) (e.g., XCOFF Object (a.out) File Format).

Figure 10:
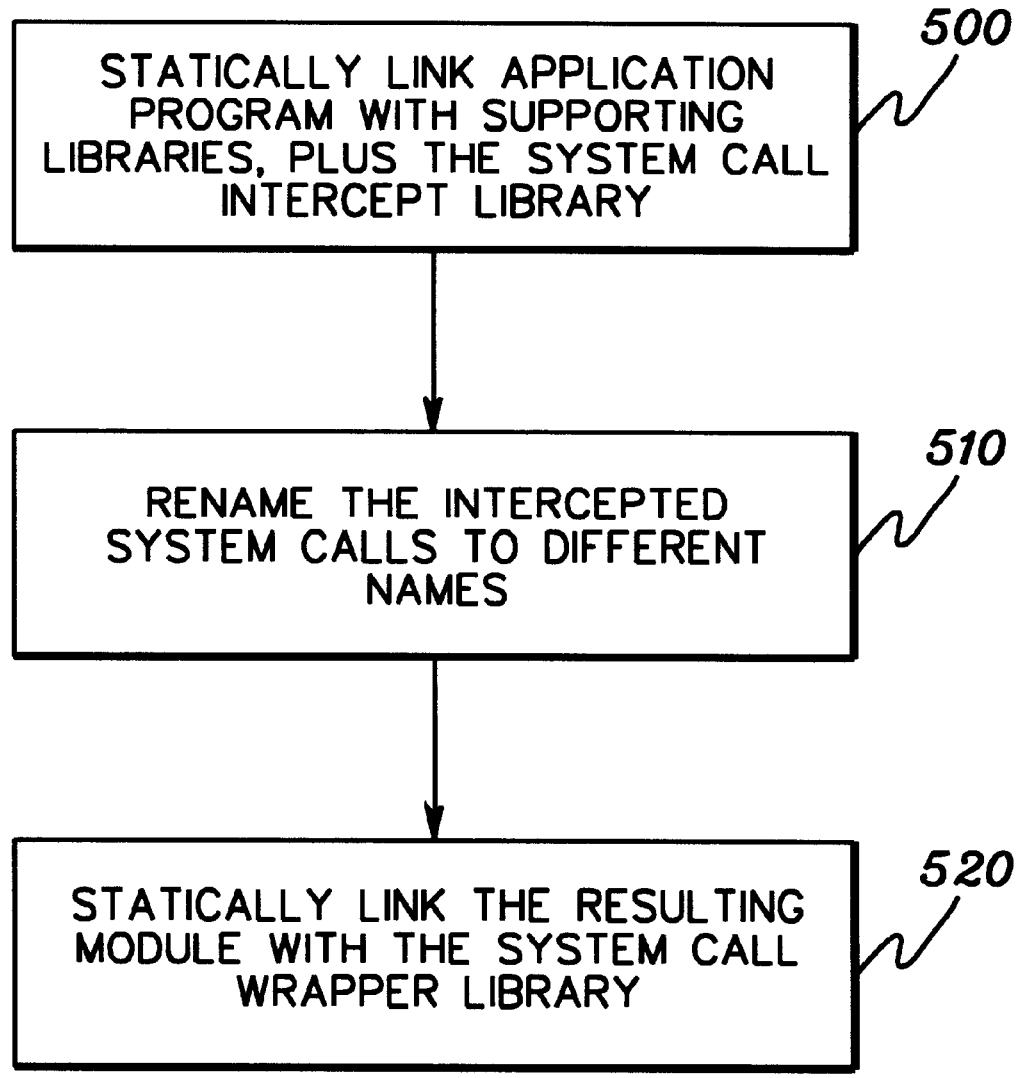
FIG. 10 depicts one embodiment of the statically linking process in accordance with the present invention.

To summarize, FIG. 10 presents an overview of linking in accordance with this invention. In a first link operation, the application process is statically linked with the supporting libraries, including the intercept library 500 to produce a first module. Any intercepted calls are then renamed to a temporary name 510, thereby producing a second module that no longer contains the original name of any intercepted call. After renaming, a second link operation is employed to statically link the resulting module with the wrapper library 520 to produce the final executable module. The result is a statically linked module which employs a wrapper library in completing resolution of an intercepted call to the system kernel or a program library.

In addition to intercepting system calls, statically linking in accordance with this invention can be employed with interception of library calls as well. There are many UNIX-variant systems wherein library calls are sometimes intercepted. One library call that is frequently intercepted is the malloc( ) library call, which is part of the dynamic memory allocator provided with the standard C library. A reason to intercept the malloc( ) call might be to help in tracking down a memory leak, or to try to analyze memory allocation parameters, or to implement a different memory allocation scheme from the standard scheme. During the link process, in order to have the program's reference to malloc( ) be resolved to the malloc( ) function in the intercept library, the intercept library must be specified before the standard C library in the invocation of the linker/binder (i.e., the ld command).

The AIX command would be similar to:

ld program.o libintercept.a /lib/crt0.o -lc -o program

The problem encountered is similar to a system call intercept wherein the wrapper library will resolve the malloc( ) call within the wrap_malloc( ) function to the intercept library. In general, to avoid this problem, the wrapper library is linked separately from the program into a dynamic link library shared object module, and its reference to malloc( ) is resolved to the malloc( ) function in the standard C library. However, if static linking is performed, then the conventional result would be one in which the malloc( ) call in wrap_malloc( ) gets resolved to the malloc( ) function in the intercept library.

Thus, the present invention can be employed in one aspect to bind the malloc( ) call in wrap_malloc( ) to the malloc( ) function in the standard C library. First, the application program is linked with the intercept library as described above so that the program's calls to malloc( ) get resolved to the malloc( ) function in the intercept library. In accordance with the invention, the malloc( ) call is then renamed to a temporary name (tmpmalloc( )), which is followed by a second link operation wherein the wrapper library and the standard C library are statically linked in order to be able to eventually execute the real malloc( )call that is in the standard C library. The AIX commands to perform this two-step static link operation in one embodiment are:

ld -bnso program.o libintercept.a -o program.tmp \
   /usr/lib/crt0.o \
   -brename:malloc,tmpmalloc \
   -brename:.malloc,.tmpmalloc \
   .....
   -r -lc ld -bnso program.tmp libwrap.a \
   -bI:/usr/lib/syscalls.exp -lc -o program Note from the above commands that the invention links in the standard C library in both the link operations, i.e., the term "-lc" is included in both of the "ld" operations. The result may be thought of as two copies of the standard C library, which is not problematic.

The malloc( ) function is only one example of a library call, and any function in the standard C library, or other library, can be intercepted and used in a statically linked program pursuant to this invention. Those skilled in the art will note that intercepting library calls in accordance with this invention expands the applicability of the statically linking process set forth. Whereas the system call wrapper is needed in AIX because AIX lacks a syscall( ) mechanism, the interception of library calls is applicable to most UNIX-like systems. The claims appended herewith are intended to encompass statically linking a wrapper library employed in either a system call intercept or a library call intercept.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method to statically link an application process with a wrapper library and associated system kernel, comprising:
   (i) statically linking said application process with an intercept library to create a first module;
   (ii) subsequent to said statically linking (i), renaming at least one intercepted call invoked by said application process, said renaming of said at least one intercepted call being from its original name to a temporary name, thereby creating a second module that no longer contains the original name of the at least one intercepted call; and
   (iii) statically linking the second module with said wrapper library to create an executable module.

2. The method of claim 1, wherein said wrapper library comprises a system call wrapper library having a wrap function, and wherein said statically linking (iii) comprises resolving said wrap function to a system call of said associated system kernel.

3. The method of claim 1, wherein said statically linking (i) further comprises statically linking said application process with a standard program library along with said intercept library to create said first module.

4. The method of claim 1, wherein said statically linking (i) results in an undefined external reference, and wherein said method further comprises ignoring said undefined external reference during said statically linking (i).

5. The method of claim 1, wherein said renaming (ii) comprises identifying at least one system call invoked by said application process having an original name to be intercepted, said at least one system call comprising said at least one intercepted call.

6. The method of claim 1, wherein said intercept library comprises part of a checkpoint library.

7. The method of claim 1, wherein said renaming (ii) comprises identifying at least one library call invoked by said application process having an original name to be intercepted, said at least one library call comprising said at least one intercepted call.

8. The method of claim 1, wherein said statically linking (i) further comprises statically linking said application process with a standard program library along with said intercept library to create said first module, and wherein said renaming (ii) comprises renaming said at least one intercepted call from its original name to said temporary name in both said standard program library and said intercept library.

9. A system for statically linking an application process with a wrapper library and associated system kernel, comprising:
   means for statically linking said application process with an intercept library to create a first module;
   means for renaming, subsequent to creation of said first module, at least one intercepted call invoked by said application process, said renaming of said at least one intercepted call being from its original name to a temporary name, thereby creating a second module that no longer contains the original name of the at least one intercepted call; and
   means for statically linking the second module with said wrapper library to create an executable module.

10. The system of claim 9, wherein said wrapper library comprises a system call wrapper library having a wrap function, and wherein said means for statically linking said second module with said system call wrapper library comprises means for resolving said wrap function to a system call of said associated system kernel.

11. The system of claim 9, wherein said means for statically linking said application process with said intercept library comprises means for statically linking said application process with a standard program library along with said intercept library to create said first module.

12. The system of claim 9, wherein said means for statically linking said application process with said intercept library temporarily results in an undefined external reference, and wherein said system further comprises means for ignoring said undefined external reference during said linking of said application process to said intercept library.

13. The system of claim 9, wherein said means for renaming said at least one intercepted call comprises means for identifying at least one system call invoked by said application process having an original name to be intercepted, said at least one system call comprising said at least one intercepted call.

14. The system of claim 9, wherein said intercept library comprises part of a checkpoint library.

15. The system of claim 9, wherein said means for renaming said at least one intercepted call comprises means for identifying at least one library call invoked by said application process having an original name to be intercepted, said at least one library call comprising said at least one intercepted call.

16. The system of claim 9, wherein said means for statically linking said application process with said intercept library comprises means for statically linking said application process with a standard program library along with said intercept library to create said first module, and wherein said means for renaming comprises means for renaming said at least one intercepted call from its original name to said temporary name in both said standard program library and said intercept library.

17. An article of manufacture comprising:
   at least one computer usable medium having computer readable program code means embodied therein for statically linking an application process with a wrapper library and associated system kernel, the computer readable program code means in the article of manufacture comprising:
   (i) computer readable program code means for causing a computer to effect statically linking said application process with an intercept library to create a first module;
   (ii) computer readable program code means for causing a computer to effect renaming, subsequent to creation of said first module, at least one intercepted call invoked by said application process, said renaming of said at least one intercepted call being from its original name to a temporary name, thereby creating a second module that no longer contains the original name of said at least one intercepted call; and
   (iii) computer readable program code means for causing a computer to effect statically linking the second module with said wrapper library to create an executable module.

18. The article of manufacture of claim 17, wherein said wrapper library comprises a system call wrapper library having a wrap function, and wherein said computer readable program code means for causing a computer to effect statically linking (iii) said second module with said system call wrapper library comprises computer readable program code means for causing a computer to effect resolving said wrap function to a system call of said associated system kernel.

19. The article of manufacture of claim 17, wherein said computer readable program code means for causing a computer to effect statically linking (i) comprises computer readable program code means for causing a computer to effect statically linking said application process with a standard program library along with said intercept library to create said first module.

20. The article of manufacture of claim 17, wherein said computer readable program code means for causing a computer to effect statically linking (i) temporarily results in an undefined external reference, and wherein said article of manufacture further comprises computer readable program code means for causing a computer to effect ignoring of said undefined external reference during linking of the application process with said intercept library.

21. The article of manufacture of claim 17, wherein said intercept library comprises part of a checkpoint library.

22. The article of manufacture of claim 17, wherein said computer readable program code means for causing a computer to effect renaming comprises computer readable program code means for causing a computer to effect identifying at least one system call invoked by said application process having an original name to be intercepted, said at least one system call comprising said at least one intercepted call.

23. The article of manufacture of claim 17, wherein said computer readable program code means for causing a computer to effect renaming comprises computer readable program code means for causing a computer to effect identifying at least one library call invoked by said application process having an original name to be intercepted, said at least one library call comprising said at least one intercepted call.

24. The article of manufacture of claim 17, wherein said computer readable program code means for causing a computer to effect statically linking (i) further comprises computer readable program code means for causing a computer to effect statically linking said application process with a standard program library along with said intercept library to create said first module, and wherein said computer readable program code means for causing a computer to effect renaming comprises computer readable program code means for causing a computer to effect renaming said at least one intercepted call from its original name to said temporary name in both said standard program library and said intercept library.

* * * * *